(12) United States Patent
Nakada

(10) Patent No.: US 9,074,623 B2
(45) Date of Patent: Jul. 7, 2015

(54) INCREMENTED FORCE BEARING

(76) Inventor: Morihito Nakada, Namerikawa (JP)

( * ) Notice: Subject to any disclaimer, the term of this patent is extended or adjusted under 35 U.S.C. 154(b) by 0 days.

(21) Appl. No.: 14/007,550

(22) PCT Filed: Jun. 6, 2012

(86) PCT No.: PCT/JP2012/064520
§ 371 (c)(1),
(2), (4) Date: Sep. 25, 2013

(87) PCT Pub. No.: WO2013/183124
PCT Pub. Date: Dec. 12, 2013

(65) Prior Publication Data
US 2014/0248017 A1   Sep. 4, 2014

(51) Int. Cl.
*F16H 25/06* (2006.01)
*F16C 19/55* (2006.01)

(52) U.S. Cl.
CPC ............... *F16C 19/55* (2013.01); *F16H 25/06* (2013.01)

(58) Field of Classification Search
CPC ............ F16H 25/06; F16H 2025/063; F16H 2025/066; F16H 49/001; F16H 2049/003; F16H 2049/006; F16H 2049/008; F16C 19/55; Y10T 74/19005
USPC .................................. 384/461; 475/162–180
See application file for complete search history.

(56) References Cited

U.S. PATENT DOCUMENTS

| | | | |
|---|---|---|---|
| 4,179,943 A | 12/1979 | Gamba | |
| 4,618,271 A * | 10/1986 | Li | 384/461 |
| 4,713,985 A * | 12/1987 | Ando | 475/168 |
| 4,736,654 A * | 4/1988 | Ren | 475/168 |
| 4,798,104 A * | 1/1989 | Chen et al. | 74/63 |
| 4,838,741 A * | 6/1989 | Dumoulin | 409/131 |
| 4,843,911 A * | 7/1989 | Minegishi et al. | 475/180 |
| 5,431,605 A * | 7/1995 | Ko | 475/168 |
| 6,314,826 B1 * | 11/2001 | Cunningham et al. | 74/216.3 |
| 6,416,438 B1 | 7/2002 | Choi et al. | |

FOREIGN PATENT DOCUMENTS

| | | |
|---|---|---|
| JP | 51-136079 A | 11/1976 |
| JP | 54-8050 | 1/1979 |
| JP | 61-133158 U | 8/1986 |
| JP | 10-267048 A | 10/1998 |
| JP | 2002-543351 A | 12/2002 |

OTHER PUBLICATIONS

International Search Report of PCT/JP2012/064520 (2 pages).

* cited by examiner

*Primary Examiner* — Alan B Waits
(74) *Attorney, Agent, or Firm* — Flynn, Thiel, Boutell & Tanis, P.C.

(57) ABSTRACT

An incremented force bearing has a bearing substrate formed of multiple rings made up of an inner ring, an outer ring, an intermediate ring interposed between the inner and outer rings, rotators interposed between respective rings for causing the respective rings to rotate with one another, levers arranged in a row around a center of the upper surface of the bearing substrate, and an annular recess provided around the center of the bearing substrate and recessed in respective rings, the annular recess having wavy slide surfaces as recessed surfaces by which levers are pressed to the inner and outer rings.

3 Claims, 5 Drawing Sheets

F I G. 2
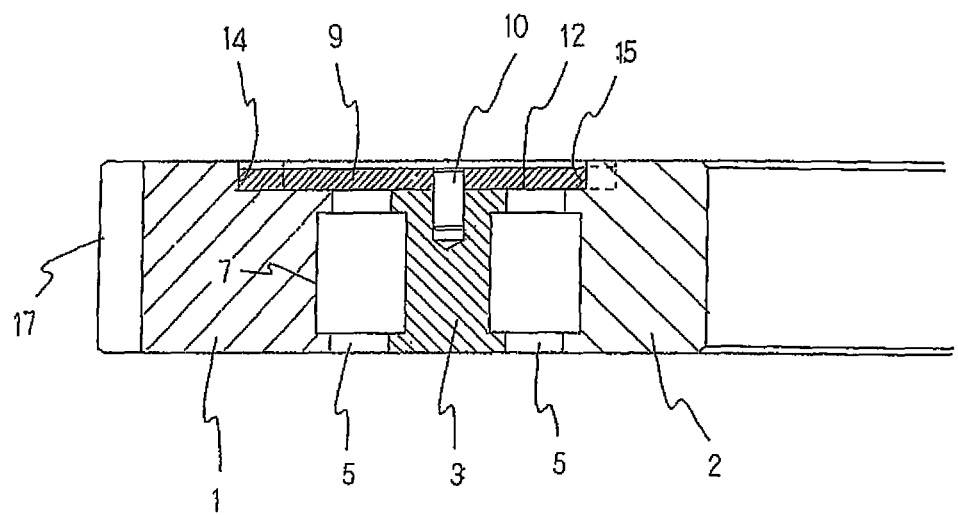

INCREMENTED FORCE BEARING

The present invention relates to an incremented force bearing for use in increasing a force applied to wheels of aircrafts, electric cars, bicycles for an aged or disabled person, or the like, or for use in an auxiliary power of a wind generator, etc.

RELATED ART

A conventional bearing supports rotators relative to an axle, and it is divided broadly into a radial bearing and a thrust bearing, of which the radial bearing comprises an inner ring in which the axle is engaged, an outer ring disposed outside the inner ring, and many bearings interposed between the inner and outer rings, wherein respective bearings (rotators) are housed in a ring-shaped retainer.

Accordingly, a rotational friction between the inner ring and the outer ring is exceedingly small and there is no resistance therebetween so that rotators can be pivotally mounted on the axle to be smoothly rotated relative to the axle. However, since a force is not incremented between the inner ring and the outer ring, an incremented force mechanism is separately needed so that a force that is larger than an applied force can rotate the rotators.

For example, in the case of a bicycle, a derailleur can serve as an incremented force mechanism. However, in the case of the bicycle, since a drive axle of a pedal and a driven axle of wheels are juxtaposed to each other, the derailleur can be made up of a chain, but the derailleur cannot be mounted on the same axle. Accordingly, it was not possible to provide an incremented force mechanism on a wheelchair wherein a hand-operated wheel and wheels of the wheelchair are provided on the same axle. On the condition that a multiplication mechanism is provided on a wheelchair, it becomes a very complicated mechanism, and hence it becomes impossible in a practical sense, which causes the disabled person a large hardship even if the wheelchair is on a slight slant.

Further, even in the case of an electric car, the electric car requires an electric power more than a current output when driving on an upslope and it is absolutely uncompetitive compared with a gasoline-powered car.

SUMMARY OF THE INVENTION

In view of the foregoing circumstances, it is an object of the present invention to provide an incremented force bearing for outputting a rotative force applied to the outer ring to the inner ring as an incremented force, and means for generating an incremented force can be provided on the same axle, thereby providing an incremented force mechanism wherein a mechanism for obtaining an incremented force or intended force is simplified.

The present invention solved the foregoing problems by providing an incremented force bearing comprising a bearing substrate formed of multiple rings made up of an inner ring 2, an outer ring 1, and at least one intermediate ring 3; 3a, 3b, interposed between the inner and outer rings 2, 1, rotators 5 interposed between respective rings 2, 1, 3; 3a, 3b so as to rotate with one another, and an annular recess 12 provided on and recessed in the upper surface of the bearing substrate wherein levers 9 are arranged in a row around a center of the upper surface of the bearing substrate, said annular recess 12 having wavy slide surfaces as recessed surfaces by which levers 9 are pressed to the inner and outer rings 2, 1, wherein a waveform pitch of the outer ring 1 is formed wider than that of the inner ring 2, wherein the arrangement of the levers 9 is such that the lever joined to the slide surface 14 of the outer ring 1 and pivotally mounted on the intermediate ring 3; 3a, 3b by a check pin 10 serves as a main lever 21, or an auxiliary lever 23 working with the main lever 21 being joined the slide surface (15) of the inner ring 2, whereby due to the arrangement of these levers 9, a pressing force generated by wavy joining between the outer ring 1 and the levers 9 upon reception from the wavy slide surface 14 of the outer ring 1 presses the wavy slide surface 15 of the inner ring 2 by way of one or more levers 9, causing crest parts 15b of the wavy slide surface 15 of the inner ring 2 to be sequentially forwarded to rotate the inner ring 2.

Since the incremented force bearing has been configured as set forth above, when the outer ring is rotated, the wavy slide surface formed on the outer ring is simultaneously rotated, so that the levers pivotally mounted on the inner ring are rotated about the check pins while pressed by the wavy slide surface at the end thereof so that the main lever or the auxiliary lever working with the main lever presses the wavy slide surface of the inner ring, causing crest parts of the wavy slide surface of the inner ring to be sequentially forwarded to rotate the inner ring. However, since the waveform pitch is wider in the outer ring so as to have a larger workload, an incremented force rotates the inner ring.

As explained above in detail, according to the incremented force bearing of the present invention, the rotative force applied to the outer ring is outputted to the inner ring as an incremented force so that if rotators are fitted to the inner ring, the rotation of the outer ring can strongly work on the rotators, and means for working the rotation on the rotators is a bearing mechanism to be mounted on the same axle, thereby achieving an excellent effect to incredibly simplify the mechanism for obtaining an incremented force of the rotation when used in various machines, vehicle bodies, equipments, etc.

For example, if the incremented force bearing of the present invention is applied to the wheels of an aircraft, when the aircraft runs on a taxiway through a runway, a lot of fuel consumption is saved. If the incremented force bearing is incorporated into a derailleur of a bicycle for hill climbing or a derailleur of a bicycle for racing, it can assist an operator. Further if the incremented force bearing is applied to auxiliary wheels of the wheel chair, it is possible to obtain strong hill-climbing ability in a sloping road, etc. Further, if the incremented force bearing is applied to a wind generator, it exhibits an excellent effect as an auxiliary power when the wind power is weakened.

Meanwhile, according to the second aspect of the invention, the structure is simple in particular, and according to the third aspect of the invention, a much larger increased force can be obtained.

BRIEF DESCRIPTION OF THE INVENTION

FIG. 2 is a sectional view of a part of the incremented force bearing shown in FIG. 1 as viewed from the side thereof;

BEST MODE FOR CARRYING OUT THE INVENTION

The incremented force bearing of the present invention comprises a bearing substrate made up of an inner ring 2, an outer ring 1 and one or plural rotators interposed between the inner ring 2 and the outer ring 1. The shapes of the rotators 5 can be varied. Further, one or more levers may be used for transmitting a power from the outer ring 1 to the inner ring 2.

First Embodiment

Figure 1:
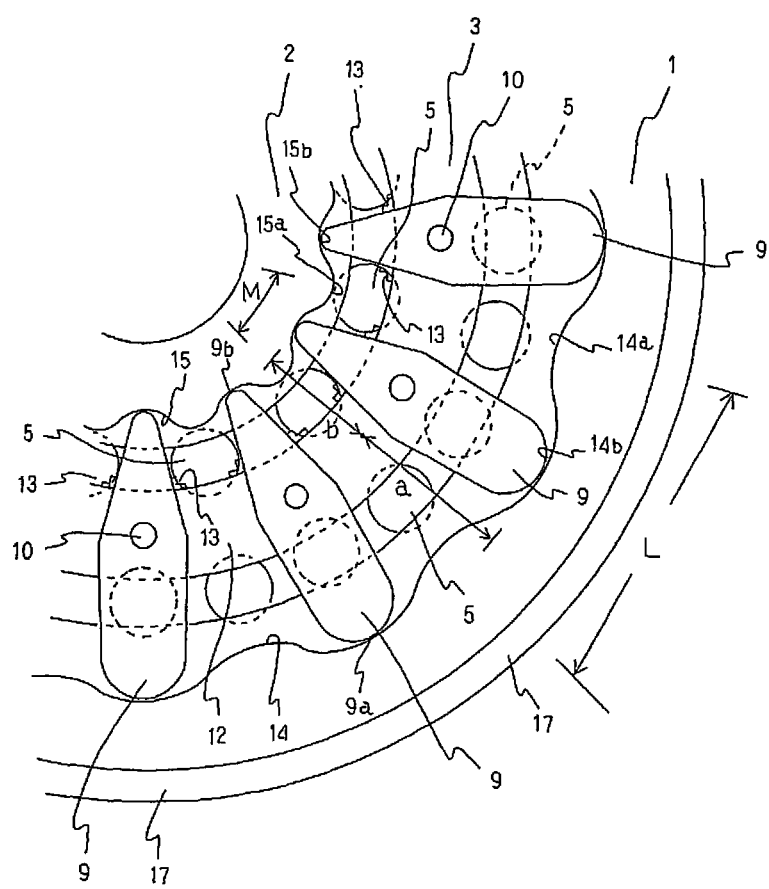
FIG. 1 is a plan view of a part of an incremented force bearing according to a first embodiment of the present invention.
Figure 3:
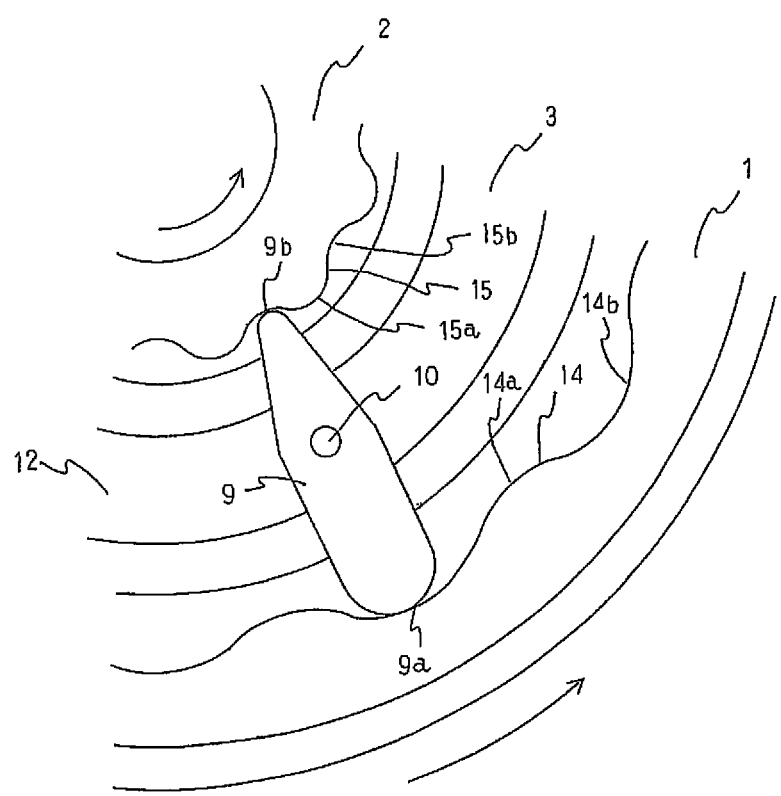
FIG. 3 is a plan view of a part of the incremented force bearing shown in FIG. 1 for explaining a rotative operation of the incremented force bearing by use of one lever.

FIGS. 1 to 3 show a first embodiment of the present invention, wherein the incremented force bearing of the present invention comprises an inner ring 2, an outer ring 1 and an intermediate ring 3 interposed between the inner ring 2 and the outer ring 1, forming a disc-shaped substrate, wherein rotators 5, 5 . . . are interposed between the intermediate ring 3 and the outer ring 1 and between the intermediate ring 3 and the inner ring 2 so that the inner ring 2 and the outer ring 1 can be rotated independently of each other. In this case, the rotators 5, 5 . . . are columnar and each rotator 5 is provided with a hole 7 at the central part thereof. A plurality of levers 9, 9 . . . are arranged radially on the upper surface of the substrate and they are in the form of plates and are held on the intermediate ring 3 by check pins 10 to be horizontally rotated.

In order to arrange the levers 9, 9 . . . , there are provided on the upper surface of the bearing substrate an annular recess 12 having a lower upper surface under which the intermediate ring 3 is formed and a lower upper surface formed by recessing a part of the intermediate ring 2 and a part of the outer ring at both sides of the intermediate ring 3. Recessed side surfaces of the annular recess 12 are formed on both the inner ring 2 and the outer ring 1, and they are formed in a wavelike fashion as slide surfaces 14, 15 which both ends of the levers 9, 9 . . . enter into or leave from.

The slide surfaces 14, 15 have wavy crest parts 14a, 15a and valley parts 14b, 15b, and these parts 14b, 15b are positioned in the same direction but pitches of these parts 14b, 15b at the outer ring side are several times as large as these parts 14b, 15b at the inner ring 1 side. Meanwhile, a gear tooth 17 is formed on the outer periphery of the outer ring 1.

A half part of each lever 9 is formed wider and another half part is formed gradually narrower toward the inner side thereof. Each lever 9 has one end formed of a wider arc end edge 9a and another end formed of a narrower arc end edge 9b, which are respectively joined to the wavy slide surfaces 14 and 15. When each lever 9 is directed toward the center of the inner ring 2, the wider arc end edge 9a and the narrower arc end edge 9b are respectively recessed in the valleys 14b, 15b (FIG. 1).

A pair of retaining springs 13, 13 for clamping the narrowing end parts of the levers 9, 9 . . . are provided for respective levers 9, 9 . . . The retaining springs 13, 13 are bent in an L-shape and is held on the side surface of the intermediate ring 3. Since both the retaining springs 13, 13 clamp the levers 9, 9 . . . elastically at the inclined edge portions which are gradually narrower toward the tip end, when the levers 9, 9 . . . move, the levers 9, 9 . . . are liable to obtain a return force to move them toward the wider arc end edge 9a.

In the state shown in FIG. 1, when the outer ring 1 is rotated in one direction (in the direction of arrow in FIG. 3), the wider arc end edge 9a of each lever 9 is pressed by the crest part 14a, the check pin 10 is moved together with the intermediate ring 3 so that the narrower arc end edge 9b presses the valley part 15b (the side surface of the crest part 15a) of the slide surface 15 of the inner ring 2 to rotate the inner ring 2 in one direction (in the direction of arrow in FIG. 3), while each lever 9 is inclined.

When the outer ring 1 is further rotated and the levers 9, 9 . . . get over the crest parts 14a, 14a . . . , the wider arc end edges 9a, 9a . . . of the levers 9, 9 . . . are returned to the valley parts 14b, 14b . . . while the narrower arc end edges 9b, 9b . . . get over the crest parts 15a, 15a . . . , then fall to the valley parts 15b (FIG. 1).

When the operations as set forth above are repeated to rotate the outer ring 1 and the inner ring 2 at the same time. Regarding the waveforms of the slide surfaces 14 and 15, a pitch L at the outer ring 1 is larger than a pitch M at the inner ring 1, namely, establishing a formula L>M, the rotation of the outer ring 1 works on the rotation of the inner ring 2 as a incremented force. Further, the check pin 10 serving as a fulcrum of each lever 9 is deviated slightly away from the halfway point of the lever 9 and the base part gets long to establish a formula a>b, and hence not only the formula L>M but also the formula a>b works as a incremented force, thereby synergistically working on the inner ring 2.

Second Embodiment

Figure 4:
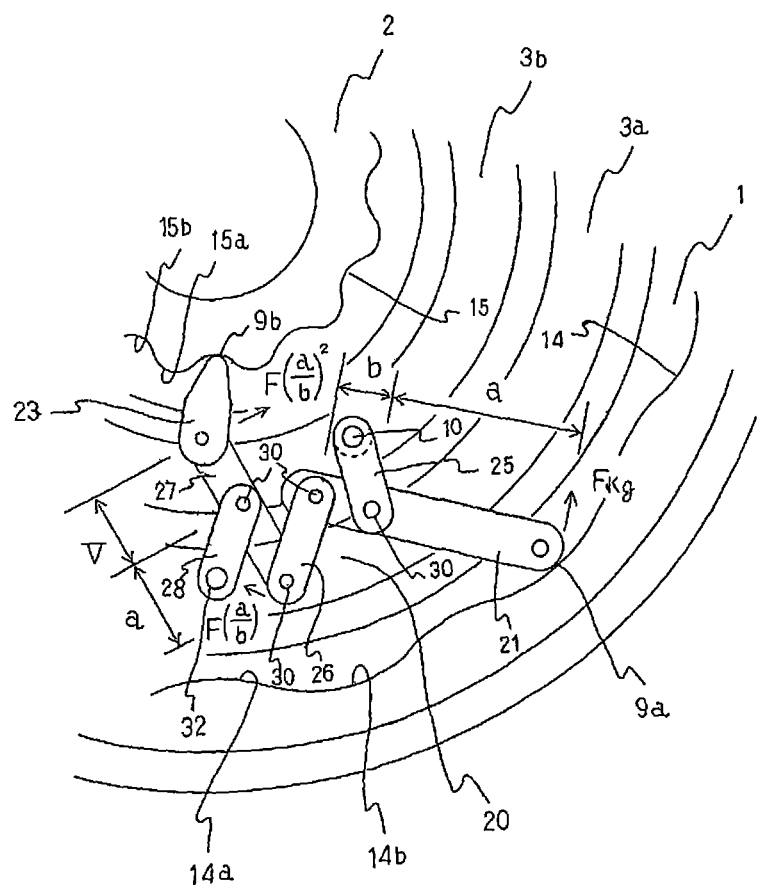
FIG. 4 is a plan view of a part of an incremented force bearing according to a second embodiment of the present invention for explaining a link mechanism with reference to one main lever (while omitting other components)
Figure 5:
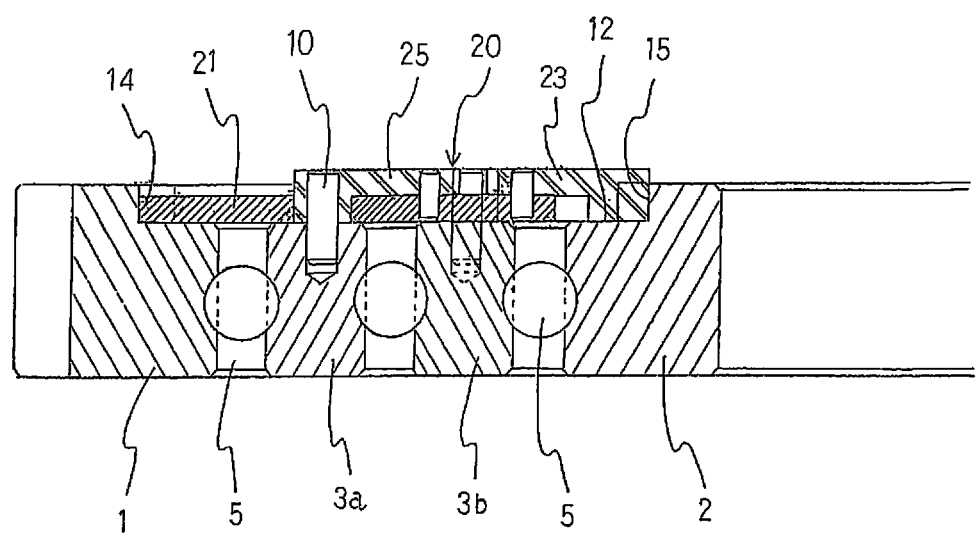
FIG. 5 is a sectional view of a part of the incremented force bearing shown in FIG. 4 as viewed from the side thereof.

FIGS. 4 and 5 represents a second embodiment wherein a bearing substrate comprises an inner ring 2, an outer ring 1, two intermediate rings 3a and 3b, and rotators 5, 5 . . . which are interposed therebetween so as to freely rotate the inner ring 2, the outer ring 1, and the intermediate rings 3a, 3b, respectively. An annular recess 12 is formed on the upper surface of the bearing surface and wavy slide surfaces 14, 15 are formed on the outer ring 1 and the inner ring 2 as the edges of the annulus recess 12.

The foregoing configuration of the second embodiment is the same as that of the first embodiment, but the second embodiment is different from the first embodiment in the following constituents. A main lever 21 joining the slide surface 14 of the outer ring 1, and an auxiliary lever 23 joining the slide surface 15 of the inner ring 2 are provided separately, and a plurality of levers 25, 26, 27, 28 are interposed between the main lever 21 and the auxiliary lever 23 to constitute an incremented force link mechanism 20. Depicted by 30 is connection pins of the levers 25 to 28 and the main lever 21 is indirectly held by a check pin 10 via the dependent lever 25. Depicted by 32 is a central bearing pin of the doubled force link mechanism 20.

In FIG. 4, an incremented force of the incremented force link mechanism 20 is explained. Supposed that the lengths of the levers about the check pin 10 serving as a fulcrum are a, b, a formula a>b is established, it represents that when the main lever 21 receive a force Fkg from the slide surface 14 at the wide wider arc end edge 9a, the narrower arc end edge 9b . . . exerts a force of a $F(a/b)^2$ kg on the slide surface 15.

Meanwhile, regarding the relation between the number and the incremented force of the incremented force link mechanism 20, if the number of a multiple lever (a>b) is 2, the incremented force becomes $F(a/b)^2$, if the number of the multiple lever is 3, the incremented force becomes $F(a/b)^3$, while if the number of the multiple lever is 4, the incremented force becomes $F(a/b)^4$, and if the number of the multiple lever is . . . n, the incremented force becomes $F(a/b)^n$.

What is claimed is:

1. An incremented force bearing comprising a bearing substrate formed of multiple rings comprising an outer ring, an inner ring, and at least one intermediate ring interposed between said outer ring and inner ring, said outer ring, inner ring and at least one intermediate ring being coaxially rotated, rotators interposed between respective outer, inner and intermediate rings so as to be mutually rotated while being coaxially rotated, horizontally swingable levers serving as an incremented force medium for transmitting a rotative force from said outer ring to said inner ring interposed between said outer and inner rings and arranged in equal intervals in the circumferential direction, and an annular recess provided on and recessed in the upper surface of said bearing substrate, said levers being arranged on said annular recess about a rotating center of the outer and inner rings, said outer and inner rings having annular wavy slide surfaces formed of repeated concavities and convexities, wherein said annular wavy slide surface of said outer ring has a pitch L of the concavities and convexities greater than a pitch M of the concavities and convexities of said annular wavy slide surface of said inner ring such that when said levers are positioned between said annular wavy slide surfaces, a driving force due to the engagement of said concavities and convexities of said annular wavy slide surface of said outer ring and said levers can be transmitted as an incremented force to said inner ring due to the engagement between said concavities and convexities of said annular wavy slide surface of said inner ring and said levers.

2. The incremented force bearing according to claim 1, wherein the levers serving as an incremented force medium are arranged such that each lever is arranged about a rotating center of said outer and inner rings in the circumferential direction, and a position of a check pin serving as a swinging fulcrum is set so that the incremented force acts on said rotating center of said outer and inner rings.

3. The incremented force bearing according to claim 1, wherein the levers serving as an incremented force medium comprise an incremented force link mechanism made up of a combination of multiple levers, said incremented force link mechanism is arranged about a rotating center of said outer and inner rings in the circumferential direction so that the incremented force acts on said rotating center of said outer and inner rings.

\* \* \* \* \*